(12) United States Patent
Chang et al.

(10) Patent No.: US 9,615,421 B1
(45) Date of Patent: Apr. 4, 2017

(54) LED CONTROL CIRCUIT

(71) Applicant: Alfasemi Inc., Taipei (TW)

(72) Inventors: Yu-Cheng Chang, Cupertino, CA (US);
Te-Lung Shih, Taipei (TW)

(73) Assignee: ALFASEMI INC., Taipei (TW)

( * ) Notice: Subject to any disclaimer, the term of this patent is extended or adjusted under 35 U.S.C. 154(b) by 0 days.

(21) Appl. No.: 14/937,980

(22) Filed: Nov. 11, 2015

(51) Int. Cl.
H05B 33/08 (2006.01)

(52) U.S. Cl.
CPC ....... *H05B 33/0848* (2013.01); *H05B 33/089* (2013.01); *H05B 33/0824* (2013.01); *H05B 33/0827* (2013.01); *H05B 33/0884* (2013.01); H05B 33/0806 (2013.01); H05B 33/0815 (2013.01); H05B 33/0821 (2013.01); H05B 33/0851 (2013.01); Y02B 20/341 (2013.01); Y02B 20/346 (2013.01); Y02B 20/347 (2013.01)

(58) Field of Classification Search
CPC .. Y02B 20/346; Y02B 20/345; Y02B 20/343; Y02B 20/347; Y02B 20/341; H05B 33/0815; H05B 33/0827; H05B 33/0851; H05B 33/0812; H05B 33/0824; H05B 33/0803; H05B 33/0848; H05B 33/086; H05B 33/089; H05B 33/0842; H05B 33/0806; H05B 33/0821; H05B 33/0884
USPC ........ 315/307, 200 R, 209 R, 186, 201, 224, 315/291, 297, 111.21, 123, 159, 185 R, 315/188, 210, 223, 228, 290, 294, 309
See application file for complete search history.

(56) References Cited

U.S. PATENT DOCUMENTS

| | | | | |
|---|---|---|---|---|
| 7,081,722 B1* | 7/2006 | Huynh | ............... | H05B 33/0818 315/185 S |
| 8,933,636 B2* | 1/2015 | Egawa | ................. | H05B 33/083 315/192 |
| 9,277,615 B2* | 3/2016 | Sakai | ................. | H05B 33/0803 |
| 9,301,353 B2* | 3/2016 | Park | .................. | H05B 33/0815 |
| 2010/0066257 A1* | 3/2010 | Lin | .................... | H05B 33/0827 315/161 |
| 2010/0164403 A1* | 7/2010 | Liu | ...................... | H05B 33/086 315/297 |
| 2010/0194298 A1* | 8/2010 | Kuwabara | ............ | H05B 33/083 315/186 |
| 2010/0308738 A1* | 12/2010 | Shteynberg | ........ | H05B 33/0812 315/185 R |
| 2011/0018452 A1* | 1/2011 | Takeuchi | ........... | H05B 33/0818 315/216 |
| 2011/0062872 A1* | 3/2011 | Jin | ..................... | H05B 33/0818 315/122 |

(Continued)

*Primary Examiner* — Thai Pham
*Assistant Examiner* — Borna Alaeddini
(74) *Attorney, Agent, or Firm* — Bacon & Thomas PLLC

(57) ABSTRACT

An LED control circuit, comprising: a current source including a positive terminal and a negative terminal for providing a current; an LED, which is disposed on a first current path, including an anode and a cathode where the anode is connected to the positive terminal of the current source; an LED monitor including an input terminal and an output terminal where the input terminal is connected to the anode or the cathode of the LED; and a second current path connected in parallel to the first current path; wherein, when the LED monitor detects that the first current meets a target value, if the source current provided by the power source is greater than the target value, a second current divided from the source current flows through the second current path.

7 Claims, 7 Drawing Sheets

(56) References Cited

U.S. PATENT DOCUMENTS

| | | | | |
|---|---|---|---|---|
| 2011/0089865 A1* | 4/2011 | Wang | ............... | H05B 33/0827 |
| | | | | 315/297 |
| 2011/0248648 A1* | 10/2011 | Liu | ............... | G09G 3/3406 |
| | | | | 315/294 |
| 2012/0161653 A1* | 6/2012 | Mao | ............... | H05B 33/0812 |
| | | | | 315/192 |
| 2012/0280622 A1* | 11/2012 | Jeong | ............... | H05B 33/083 |
| | | | | 315/122 |
| 2013/0069546 A1* | 3/2013 | Lin | ............... | H05B 33/0812 |
| | | | | 315/186 |
| 2013/0169160 A1* | 7/2013 | Kim | ............... | H05B 37/02 |
| | | | | 315/122 |
| 2014/0015424 A1* | 1/2014 | Kraft | ............... | H05B 33/0836 |
| | | | | 315/185 R |
| 2014/0015427 A1* | 1/2014 | Sagen | ............... | H05B 33/083 |
| | | | | 315/186 |
| 2015/0015148 A1* | 1/2015 | Cao | ............... | H05B 33/0827 |
| | | | | 315/186 |

* cited by examiner

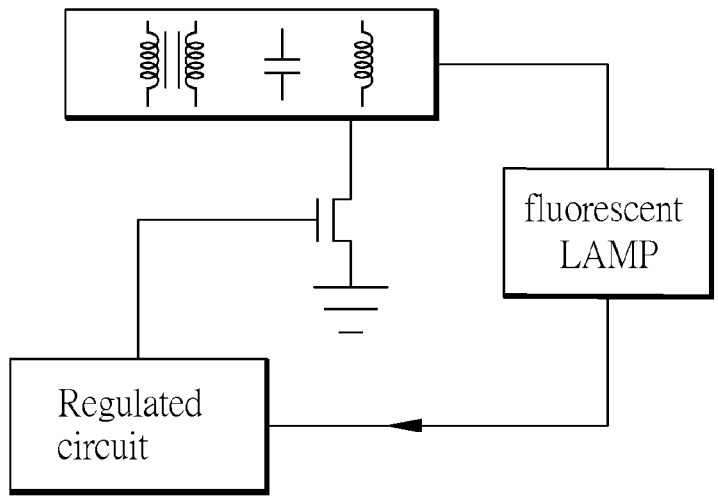
FIG. 1 (PRIORR ART)
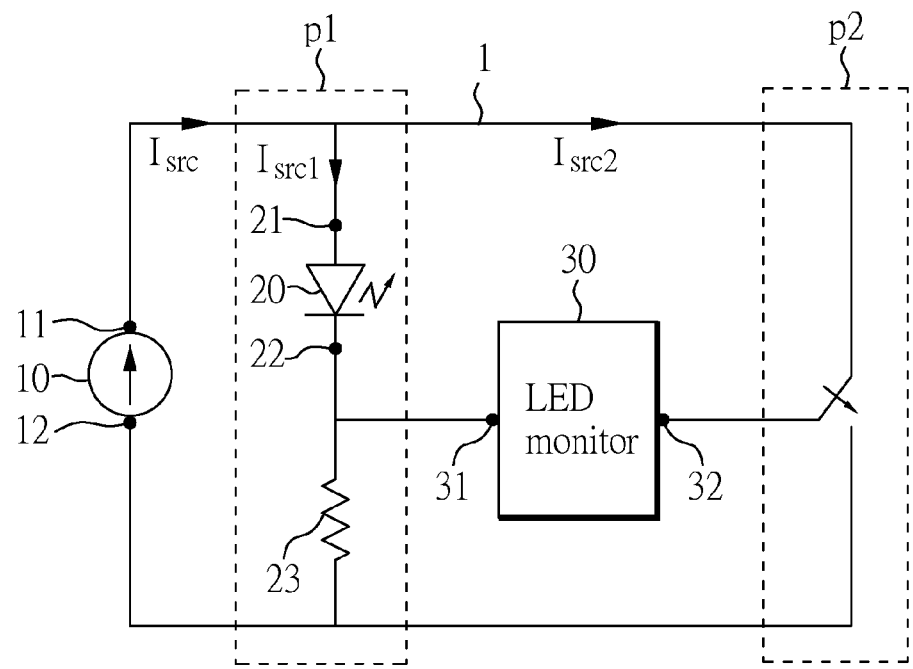
FIG. 2

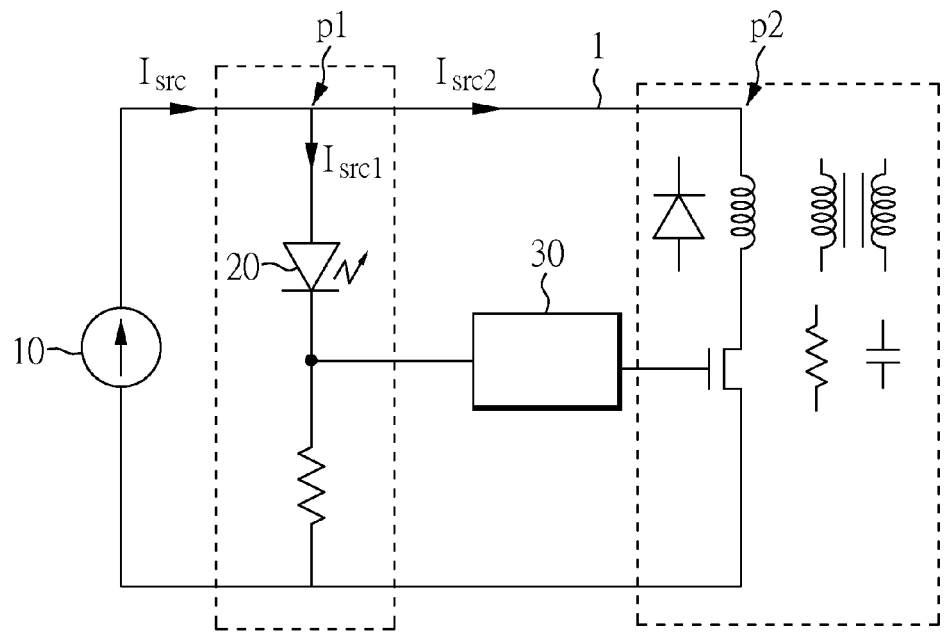
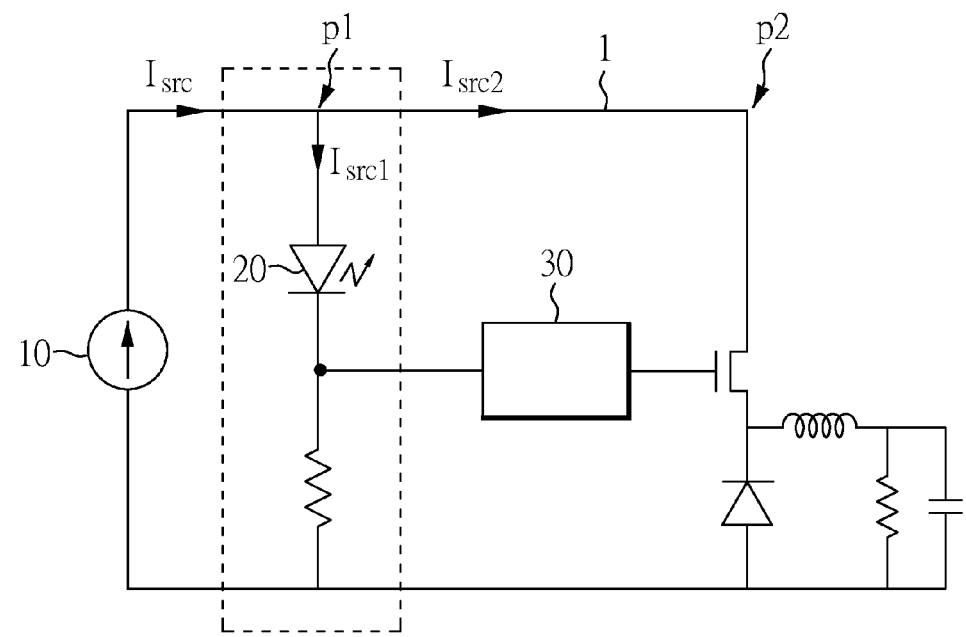
FIG. 6(B)

LED CONTROL CIRCUIT

BACKGROUND OF THE INVENTION

1. Field of the Invention

The present invention relates to a control circuit, and more particularly, to an LED control circuit.

2. Description of Related Art

In recent years, Light Emitting Diode (LED) has been widely used in lighting application. Comparing to traditional fluorescent tube, LED tube conserves more energy and is in smaller size. Accordingly, the use of LED can save cost and space. Currently, the power for lighting an LED is provided by a power source; however, if over power flows through the LED lamps, the life of the LED lamps is reduced easily.

A typical fluorescent control circuit of prior art is presented in FIG. 1. The circuit creates a high AC voltage to ignite a fluorescent lamp, and then a AC current flows through the fluorescent tube, and a regulation circuit will regulate the AC current to maintain the desired luminous. But the LEDs transfer electricity into light by using different method, the LED lamps usually need less power to have similar luminous compared to the fluorescent lamps. In other words, typical blaster delivers more power than LED lamps need. The life cycle of LED will be shorten if LED consumes power higher than its rating.

Therefore, there is a need to provide an improved LED control circuit that can help LED tubes to work with all variable light fixtures directly and help the blasters to regulate LED currents without further modifications.

SUMMARY OF THE INVENTION

An object of the present invention is to provide an LED control circuit, comprising: a current source including a positive terminal and a negative terminal for providing a source current; an LED, which is disposed on a first current path, including an anode and a cathode where the anode is connected to the positive terminal of the current source; an LED monitor including an input terminal and an output terminal where the input terminal is connected to the cathode of the LED for monitoring a LED current flowing through the LED; and a second current path connected in parallel to the first current path; wherein when the LED monitor detects the LED current directly or through a sensing resistor meets a target value, and if an excess current is exist, the LED monitor outputs a control signal to shunt the excess current into the second current path. Thus, if the current flowing through the LED is greater than the power needed for lighting the LED, a part of the current can be shunted to another current path to reduce the possibility of the LED from being damaged.

Another object of the present invention is to provide an LED control circuit, comprising: a current source including a positive terminal and a negative terminal for providing a source current; first to (N+1)-th current paths connected in parallel to each other, where N is a positive integer greater than zero; first to N-th LEDs disposed respectively on the first to N-th current paths and each LED includes an anode and a cathode where the anode is connected to the positive terminal of the current source; first to N-th LED monitors, and each LED monitor includes an input terminal and an output terminal, where each input terminal of the first to N-th LED monitors is connected directly or indirectly to the cathode of the first to N-th LEDs, respectively; wherein when the N-th LED monitor detects if its corresponding LED current directly or through a sensing resistor meets its corresponding target value, and if a N-th excess current is exist, the N-th LED monitor outputs a N-th control signal to shunt N-th excess current into the (N+1)-th current path. Hence, if the current flowing through the LEDs is greater than the power needed for lighting the LEDs, parts of the current can be shunted to reduce the possibility of the LEDs from being damaged.

BRIEF DESCRIPTION OF THE DRAWINGS

FIG. 1 is a schematic diagram illustrating a typical LED control circuit of prior art;

FIG. 2 is a schematic diagram illustrating a first circuit structure of an LED control circuit of the present invention;

FIG. 6(B) is a schematic diagram illustrating an example that the switch is formed to buck architectures according to the present invention

DETAILED DESCRIPTION OF THE PREFERRED EMBODIMENT

Figure 3:
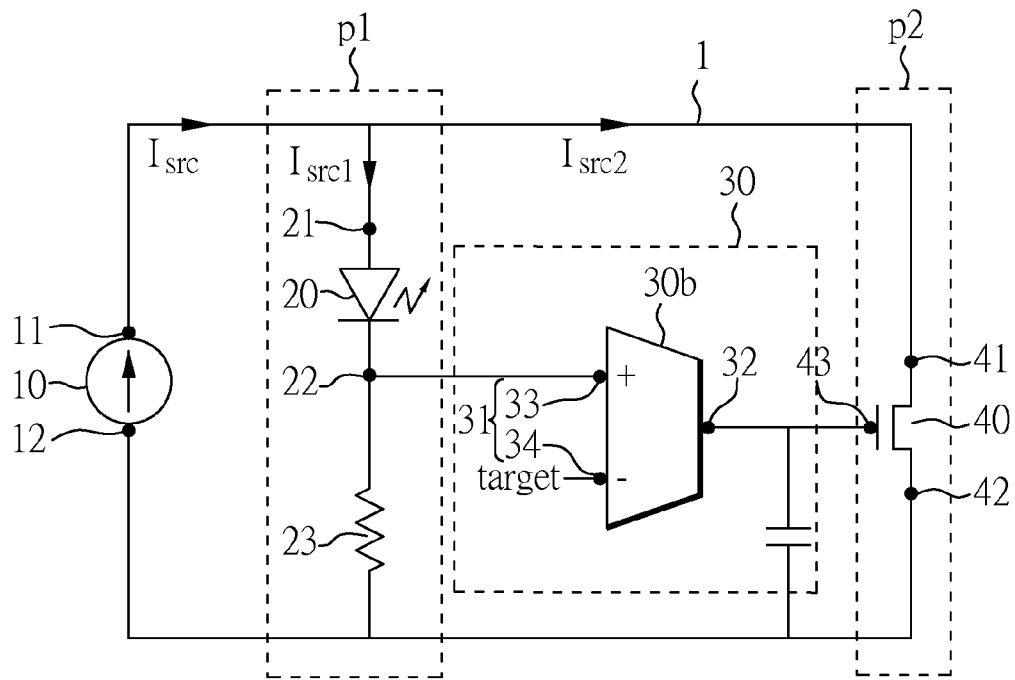
FIG. 3 is a schematic diagram illustrating another first circuit structure of an LED control circuit of the present invention.

FIG. 2 is a schematic diagram illustrating a first circuit structure of an LED control circuit of the present invention. As shown in FIG. 2, the LED control circuit 1 comprises a current source 10, an LED 20, an LED monitor 30, a first current path p1, and a second current path p2.

The current source 10 includes a positive terminal 11 and a negative terminal 12. The current source 10 provides a source current Isrc for lighting the LED 20. The LED 20 is disposed on the first current path p1. The LED 20 includes an anode 21 and a cathode 22. The anode 21 of the LED 20 is connected to the positive terminal 11 of the current source 10 so at least a part of the source current Isrc can flow through the LED 20 via the first current path p1 to provide a power for lighting the LED 20. The cathode 22 of the LED 20 is connected to the negative terminal 12 of the current source 10 directly or through a sense resistor 23. The LED monitor 30 includes an input terminal 31 and an output terminal 32. The input terminal 31 is connected to the cathode 22 of the LED 20 to monitor a first current Isrc1 flowing through the cathode 22. The second current path p2 is connected in parallel to the first current path p1. More specifically, a terminal of the second current path p2 is connected to both of the positive terminal 11 of the current source 10 and a terminal of the first current path p1. Another terminal of the second current path p2 is connected to both of the negative terminal 12 of the current source 10 and another terminal of the first current path p1.

When the LED monitor 30 detects the first current Isrc1 is smaller than a target value, the source current Isrc will only flow through the first current path p1. There will not be any current flowing through the second current path p2. When the LED monitor 30 detects the first current Isrc1 meets the target value, and the source current Isrc provided by the power source 10 is greater than the target value, i.e. an excess current is exist, the LED monitor 30 outputs a control signal to split the current Isrc to the first current Isrc1 (target value) and a second current Isrc2 (the excess current), and the second current Isrc2 will flow through the second current path p2.

It should be noted that although the input terminal 31 of the LED monitor 30 is connected to the cathode 22 of the LED 20 in this embodiment; however, the input terminal 31 of the LED monitor 30 can also be connected to the anode 21 of the LED 20 in the other embodiments.

Wherein, the first current Isrc1 can be directly detected, but the first current Isrc1 can also be converted into voltage format by using the sense resistor 23 for being detected The target value is the power needed for lighting the LED 20. When the source current Isrc is greater than the power needed for lighting the LED 20, the LED monitor 30 will output a control signal for shunting the excess current to the second current path p2. This will prevent the LED 20 from being damaged by the excess current flowing through the LED 20.

FIG. 3 is a schematic diagram illustrating another first circuit structure of an LED control circuit of the present invention. As shown in FIG. 3, the LED monitor 30 comprises an amplifier 30b, such as an OP amplifier, an OTA amplifier, or an EA amplifier. Nevertheless, these types of amplifiers are only listed here as examples and the present invention is certainly not limited hereto. In some embodiments of the present invention, the LED monitor 30 is preferably but not limited to an OTA amplifier or an EA amplifier. The input terminal 31 of the LED monitor 30 further includes a positive input terminal 33 and a negative input terminal 34. The positive input terminal 33 is connected to the cathode 22 of the LED 20 to receive first current Isrc1. The negative input terminal 34 receives the target value, wherein the target value is a predetermined value.

In addition, as shown in FIG. 3, the LED control circuit 1 further comprises a switch 40 disposed on the second current path p2. The switch 40 includes a first terminal 41, a second terminal 42, and a third terminal 43. The first terminal 41 is connected to the positive terminal 11 of the current source 10 via the second current path p2. The second terminal 42 is connected to the negative terminal 12 of the current source 10 via the second current path p2. The third terminal 43 is connected to the output terminal 32 of the LED monitor 30 to receive the control signal outputted by the LED monitor 30 to shunt a part of the current Isrc to flow through the second circuit path p2.

In some embodiments of the present invention, the LED monitor 30 is preferably but not limited an OTA amplifier or an EA amplifier, the switch 40 is preferably but not limited to a transistor. When the switch 40 is a transistor, the third terminal 43 of the switch 40 will be a gate terminal of the transistor. The transistor will be controlled by the control signal outputted by the LED monitor 30. In a preferred embodiment, the switch 40 can behaves as a variable resistor. In this case, depending on the control signal inputted to the third terminal 43 of the switch 40, the resistance of the variable resistor is changed accordingly to control the amount of the second current Isrc2 flowing through the second current path p2.

Figure 4:
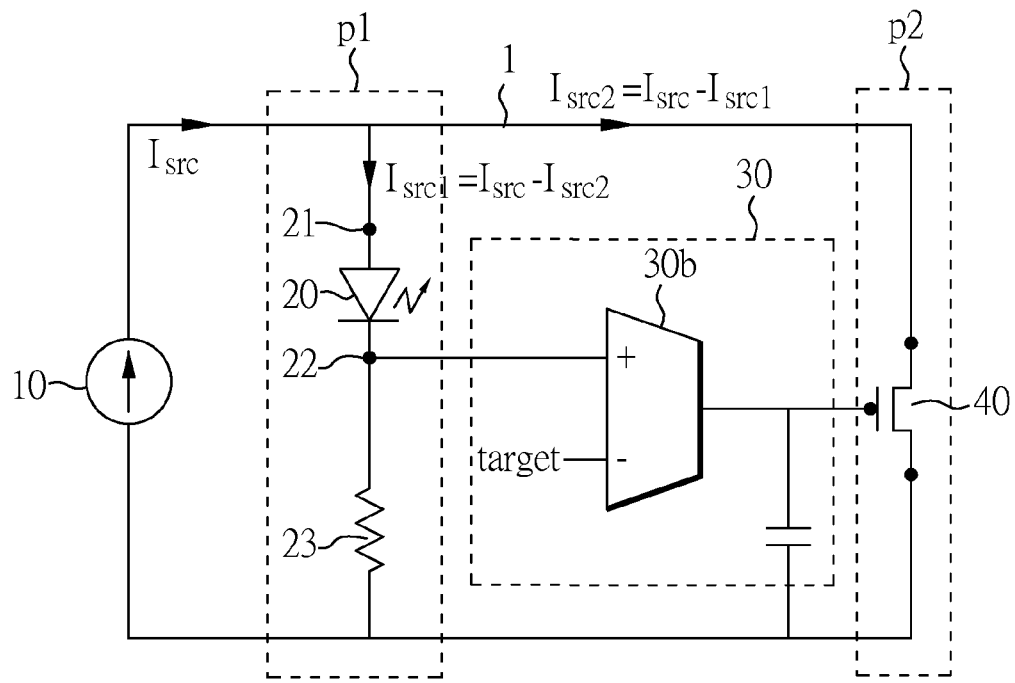
FIG. 4 is a schematic diagram illustrating an operation of a first circuit structure of an LED control circuit of a preferred embodiment of the present invention.

FIG. 4 is a schematic diagram illustrating an operation of a first circuit structure of an LED control circuit of a preferred embodiment of the invention. As shown in FIG. 4, when the source current Isrc is greater than the power needed for lighting the LED 20, the LED monitor 30 outputs a control signal to the switch 40. The switch 40 is turned on or the resistance of the switch 40 is changed. The current Isrc is split to the first current Isrc1 and the second current Isrc2 where the following equations are satisfied:

$$Isrc1 = Isrc - Isrc2;$$

wherein Isrc1 is the first current being equal to the target value, Isrc is the source current provided by the current source, and Isrc2 is the second current.

Accordingly, when first current Isrc1 is less than the power needed for lighting the LED 20, the LED control circuit 1 of the present invention does not require a regulator circuit to regulate the first current Isrc1. Instead, the present invention controls the first current Isrc1 flowing through the LED 20 to meet the target value by shunting the excess current to another current path. Since the current source 10 does not need to be regulated, the LED control circuit 1 doesn't shunt the excess current.

Figure 5:
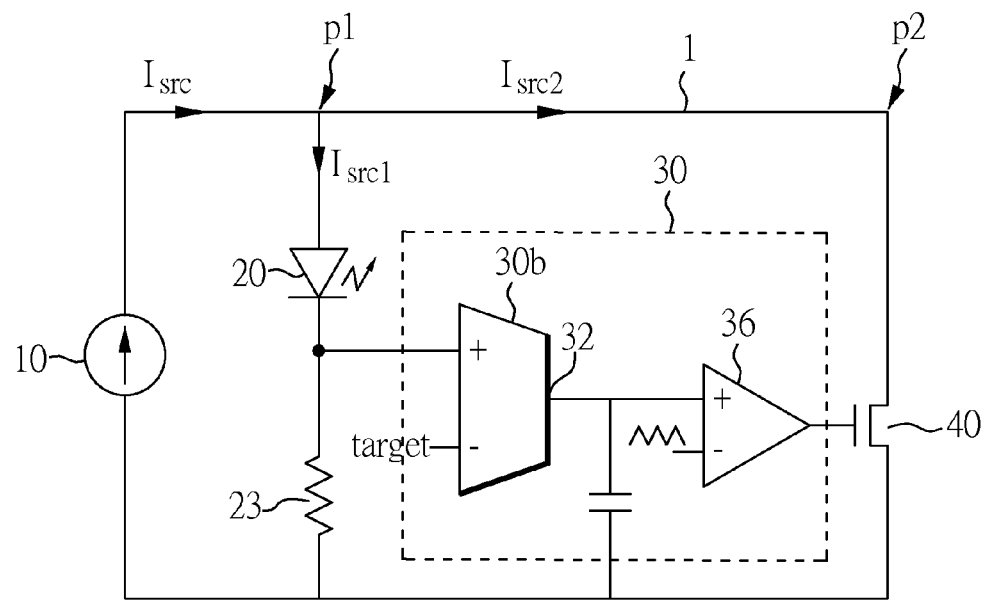
FIG. 5 is another embodiment of the first structure of the LED control circuit 1 of the presented invention.

FIG. 5 is another embodiment of the first structure of the LED control circuit 1 of the presented invention. FIG. 5 shows the second current Isrc2 is a PWM (pulse width modulation) current. In FIG. 5, there is a combination of the amplifier 30b, a comparator 36 and a switch 40 in the LED control circuit 1. The comparator 36 converts the output of the LED monitor 30 into a series of PWM, so as to change pulse width to adjust the second current Isrc2. Wherein, the first current Isrc1 is regulated to meet the target value by the PWM second current Isrc2.

More detail, when FIG. 5 is stable, Isrc2=Isrc*D. D is duty cycle, range from 0 to 100%. Meanwhile, Isrc1=Isrc*(1−D)=target current. For example, if the source current Isrc is 10 A (ampere), and the target value is 6 A, by the PWM, the source current Isrc flows through the LED 20 in 60% time duty cycle, and the source current Isrc flows through the switch 40' in 40% time duty cycle.

Figure 6A:
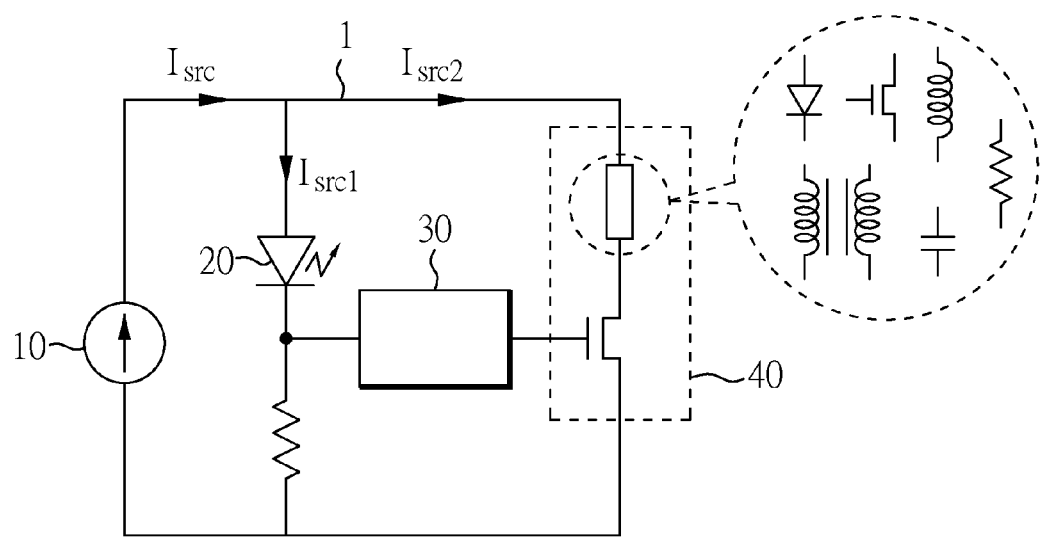
FIG. 6(A) is a schematic diagram illustrating an embodiment of the switch of the present invention.

FIG. 6 (A) is a schematic diagram illustrating an embodiment of the switch 40 of the present invention. In some embodiments, the switch 40 can be as simple as a switch only. In the present embodiment, the switch 40 can be a switch circuit composed by magnetic components such as an inductor and a transformer, a transistor, a diode, a resistor, or a capacitor. These components can be combined to form a plurality of circuit architectures, for example, the buck architecture are provided in FIG. 6(B).

Besides, these components can also be composed to form another circuit architectures, such as boost architectures, SEPIC architectures, fly-back architectures, or CUK architectures . . . etc.

Thereby, the skilled person in the art can change the structure of the LED control circuit 1 of the present invention according to the use of different current sources 10. The skilled person in the art can also change the components of the LED control circuit 1 of the present invention according to different circuit designs. For example, the switch 40 can be changed according to FIG. 6(A). It should be noted; however, that the first current Isrc1 (the first circuit Isrc1 is an average current if the current is regulated by PWM) flowing through the LED 20 must meet the target value to reduce the possibility of the LED 20 from being damaged by the excess current flowing through the LED 20.

Figure 7:
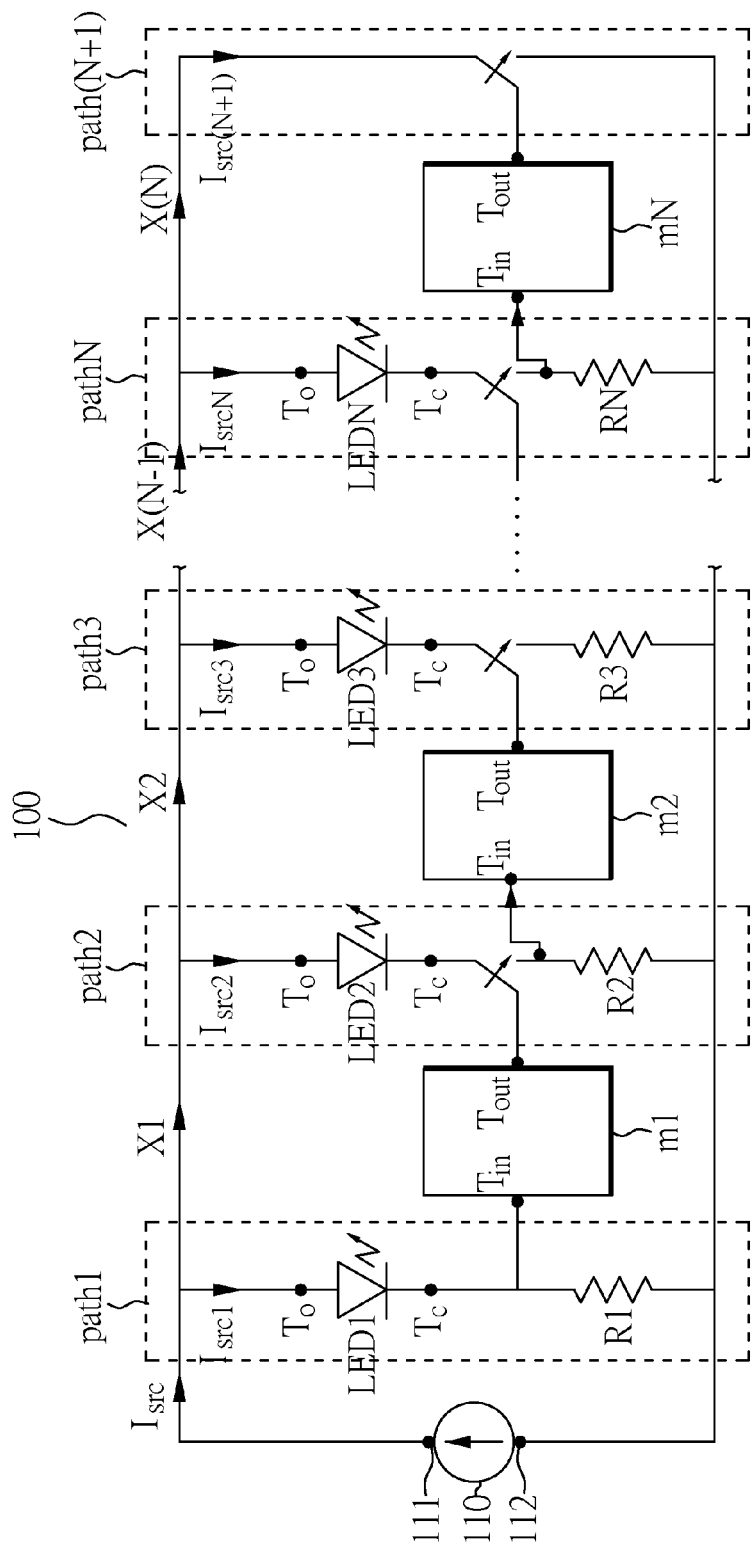
FIG. 7 is a schematic diagram illustrating a second circuit structure of an LED control circuit of the present invention.

FIG. 7 is a schematic diagram illustrating a second circuit structure of an LED control circuit of the present invention. As shown in FIG. 7, the LED control circuit 100 comprises a current source 110, first to (N+1)-th current paths path1~path(N+1), first to N-th LEDs LED1~LEDN, first to N-th LED monitors m1~mN, wherein N is a positive integer greater than one.

The current source 110 includes a positive terminal 111 and a negative terminal 112. The current source 110 provides a source current Isrc for lighting at least one LED. The first to (N+1)-th current paths path1~path(N+1) are connected in parallel to each other. The first to N-th LEDs LED1~LEDN are disposed respectively on the first to N-th current paths path1~pathN. Each LED LED1~LEDN includes an anode To and a cathode Tc. Each anode To of the first to N-th LEDs LED1~LEDN is connected to the positive terminal 111 of the current source 110. The cathode Tc of the first LED LED1 is connected to the input terminal Tin of the first LED monitor m1 directly or through a first sensing resistor R1. Each LED monitor m1~mN includes an input terminal Tin and an output terminal Tout. Each input terminal Tin of the first to N-th LED monitors m1 to mN is used to receive respectively the first to N-th current Isrc1 to IsrcN. For example, the input terminal Tin of the first LED monitor m1 is connected directly to the cathode Tc of the first LED LED1 to receive the first current Isrc1 directly or through the first sensing resistor R1. The input terminal Tin of the second LED monitor m2 is connected indirectly to the cathode Tc of the second LED LED2 to receive the second current Isrc2 directly or through a second sensing resistor R2, and so on.

When the first LED monitor m1 detects a first current Isrc1 flowing through the first LED LED1 is smaller than a target value, the source current Isrc will only flow through the first current path path1. There will not be any current flowing through the second current path path2. When the first LED monitor m1 detects the first current Isrc1 meets the first target value, and if the source current Isrc provided by the current source 110 is greater than the first target value, i.e. a first excess current X1 is exist, the first LED monitor m1 outputs a first control signal to split the source current Isrc to a first current Isrc1 (equal to the first target value) and the first excess current X1. The first current Isrc1 will flow through the first current path path1 and a second current Isrc2 will flow through the second current path path2.

The first target value is preferably based on the power needed for lighting the first LED LED1. When the current Isrc is greater than the power needed for lighting the first LED LED1, the first LED monitor m1 will output a control signal for shunting the excess current to the second current path path2. This will prevent the LED 20 from being damaged by the excess current flowing through the first LED LED1.

When the second current Isrc2 flowing through the second current path Path2, if the first excess current X1 is greater than the need for lighting the second LED LED2, i.e. a second excess current X2 is exist, the second LED monitor m2 starts to regulate the second current Isrc2 to meet a target value corresponding to the second LED2, the second LED monitor m2 will conduct the second excess current X2 into a third current path path3 and let the second current Isrc2 being meet to the second target value. The second LED monitor m2 will output a second control signal to split the first excess current X1 to the second current Isrc2 (equal to the second target value) and the second excess current X2. Thus, the first current Isrc1 (equal to the first target value) will flow through the first current path Path1, the second current Isrc2 (equal to the second target value) will flow through the second current path Path2, and a third current Isrc3 will flow through the third current path Path3.

Similarly, when a N-th current IsrcN flowing through the N-th current path PathN, if a (N−1)-th excess current X(N−1) is greater than the power needed for lighting the N-th LED, i.e. a (N)-th excess current X(N) is exist, the N-th LED monitor mN will conduct the (N)-th excess current X(N) into the (N+1)-th current Isrc(N+1) and let the N-th current IsrcN being meet to the N-th target value. Thus, a (N+1)-th current Isrc(N+1) will flow through the (N+1)-th current path Path(N+1).

Figure 8:
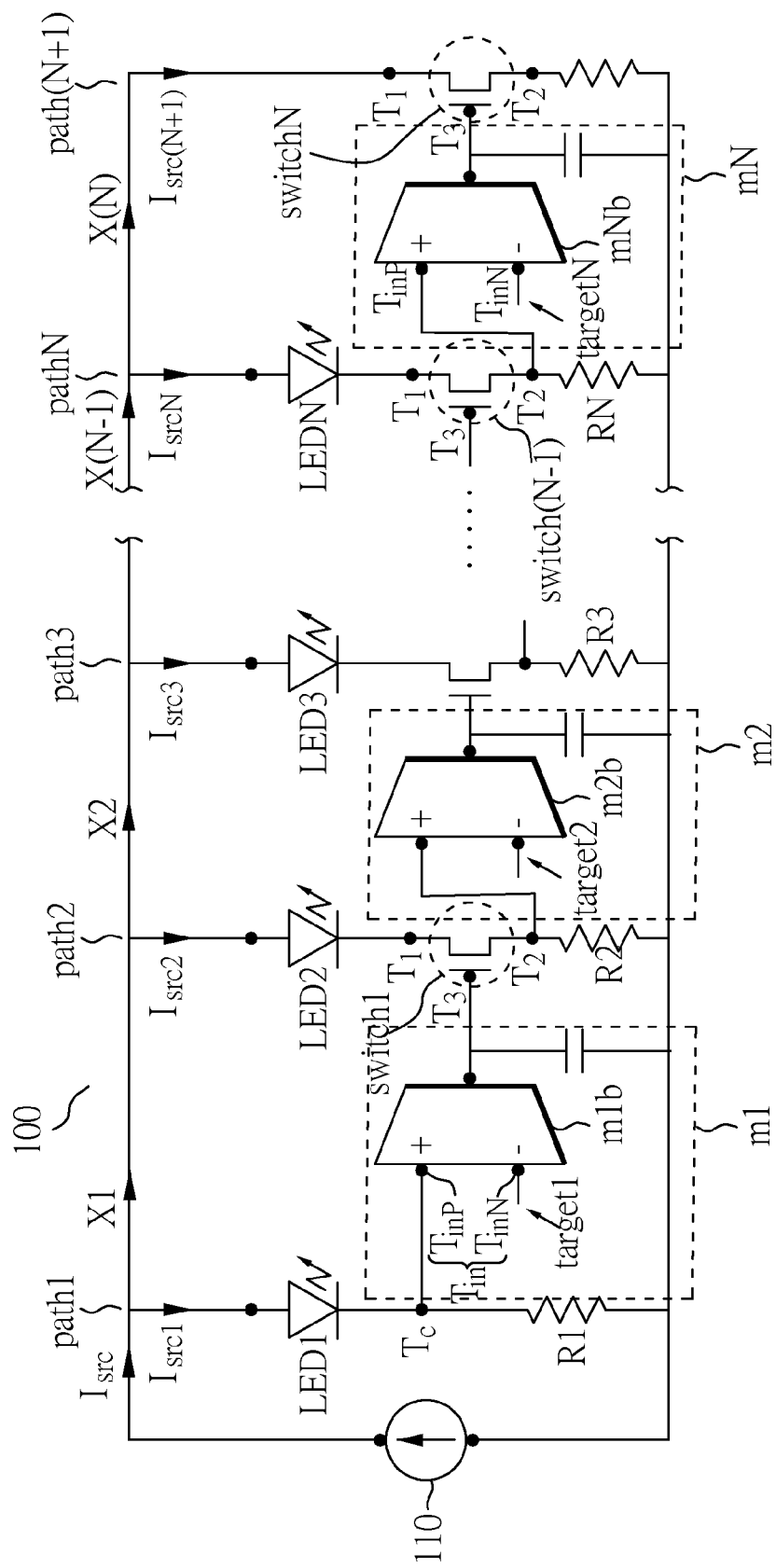
FIG. 8 is a schematic diagram illustrating another second circuit structure of an LED control circuit of the present invention.

FIG. 8 is a schematic diagram illustrating another second circuit structure of an LED control circuit of the present invention. As shown in FIG. 8, each LED monitor m1~mN comprises an amplifier m1b~mNb, such as an OP amplifier, an OTA amplifier, or an EA amplifier. Nevertheless, these types of amplifiers are only listed here as example and the present invention is certainly not limited hereto. In some embodiments of the present invention, the LED monitors m1~mN are preferably but not limited to OTA amplifiers or EA amplifiers. The input terminal Tin of each LED monitor m1~mN further includes a positive input terminal TinP and a negative input terminal TinN. The positive input terminal TinP of each LED monitor m1~mN is directly or indirectly connected to the cathode Tc of each LED LED1~LEDN, to receive the current flowing through the LED LED1~LEDN, respectively. The negative input terminal TinN of each LED monitor m1~mN receives the respective first to N-th target values target 1 to target N, wherein the first to N-th target values target 1 to target N are predetermined values.

Moreover, as shown in FIG. 8, the LED control circuit 100 further comprises first to Nth-switches switch1 to switchN disposed respectively on the second to (N+1) current paths path2~path(N+1). For example, the first switch switch1 is disposed on the second current path path2, the N-th switch switchN is disposed on the (N+1)-th current path path(N+1), and so on. Each switch switch1~switchN includes a first terminal T1, a second terminal T2, and a third terminal T3. The first terminals T1 of the first to (N−1)-th switches switch1~switch(N−1) are connected respectively to the cathodes Tc of the second to N-th LEDs LED2~LEDN via the respective second to N-th current paths. The first terminal T1 of the N-th switch switchN is connected to the positive terminal 111 of the current source 110 via the (N+1)-th current path path(N+1). The second terminals T2 of the first to N-th switches switch1~switchN are connected indirectly to the negative terminal 112 of the current source 110 through their own sensing resistors R2~RN via the respective second to (N+1)-th current paths path2~path(N+1). The third terminals T3 of the first to N-th switches switch1~switchN are connected respectively to the output terminals Tout of the first to N-th LED monitors m1~mN to receive the respective first to Nth control signals outputted by the respective first to Nth LED monitors m1~mN to shunt a part of the current Isrc to flow through the second to (N+1)-th current paths path2~path(N+1).

In some embodiments of the present invention, the switches switch1~switchN are preferably but not limited to transistors. When the switches switch1~switchN are transistors, the third terminals T3 of the switches switch1~switchN will be the gate terminals of the transistors. The transistors will be controlled by the control signals outputted by the LED monitors m1~mN. In a preferred embodiment, the switches switch1~switchN behave as variable resistors. In this case, depending on the control signals inputted to the third terminals T3 of the switches switch1~switchN, the resistances implemented by the variable resistors are changed accordingly to control the amount of the (N+1)-th current Isrc(N+1) flowing through the (N+1)-th current path path(N+1).

Figure 9:
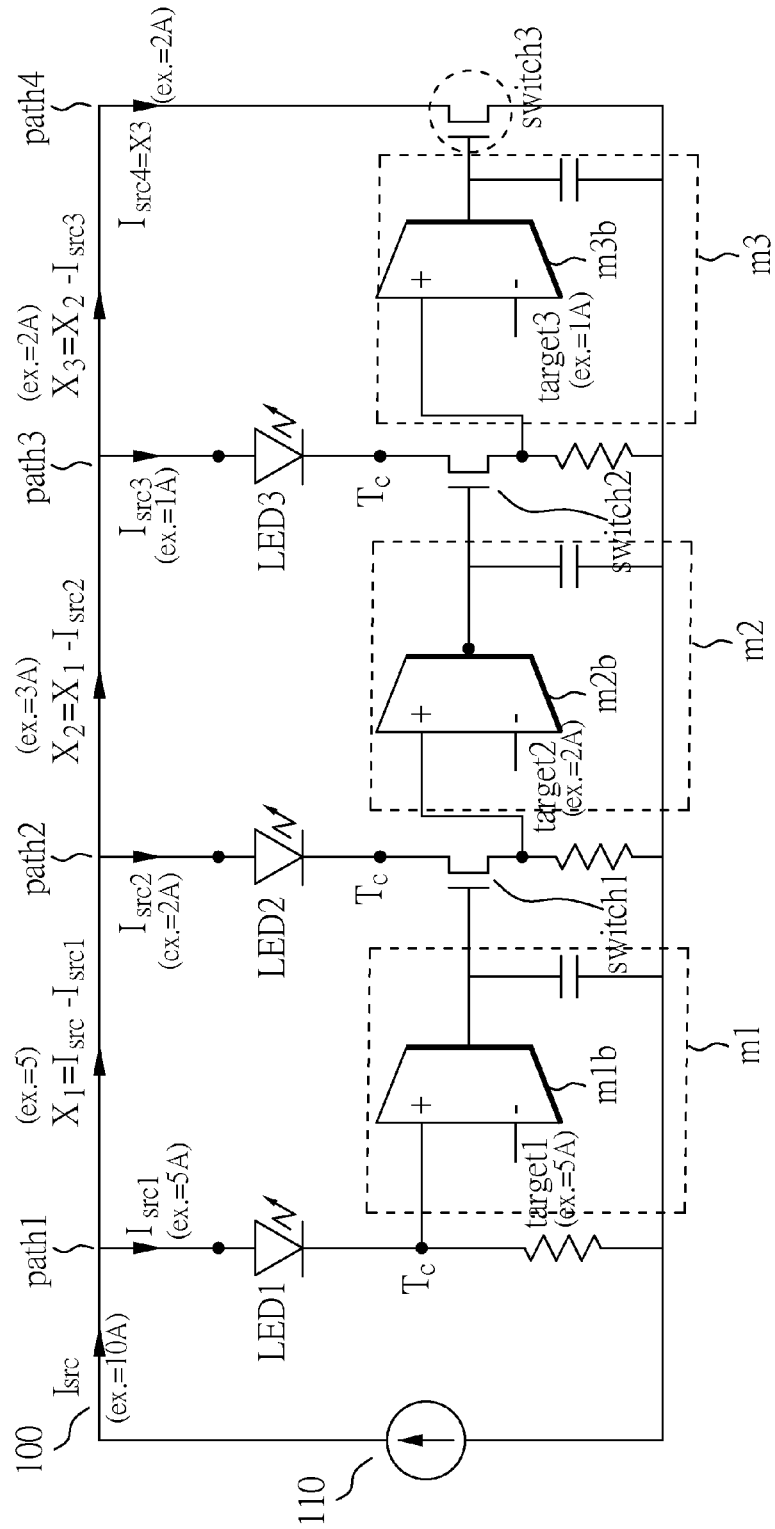
FIG. 9 is a schematic diagram illustrating an operation of a second circuit structure of an LED control circuit of a preferred embodiment of the present invention.

FIG. 9 is a schematic diagram illustrating an operation of a second circuit structure of an LED control circuit of a preferred embodiment of the present invention. For clearer description, N is set as 3, which means there are 3 LEDs LED1~LED3, 3 LED monitors m1~m3, 3 switches switch1~switch3, 3 excess currents X1~X3 (if need), 4 current paths path1~path4, and 4 currents Isrc1~Isrc4 flowing through the current paths path1~path4. When the third LED monitor m3 detects the third current Isrc3 is greater than the third target value target3, the third LED monitor m3 outputs the third control signal to the third switch switch3 to turn the third switch switch3 on or to change the resistance of the third switch switch3. The source current Isrc is split to the first to fourth currents Isrc1~Isrc4. The following equations are satisfied:

$$Isrc=Isrc1+X1;$$

$$X1=Isrc2+X2;$$

$$X2=Isrc3+X3;$$

$$X3=Isrc4;$$

Wherein Isrc is the source current provided by the current source, Isrc1~Isrc4 are the first current to the fourth current, X1~X3 are excess currents.

For example, the source current Isrc is 10 A, but the need of first current Irc1 is 5 A, so the first switch switch1 is turned on to receive the first excess current X1 (5 A), the first excess current X1 (5 A) flows through the second current path path2. But if the need of the second Irc2 is 2 A, then the second switch switch2 is turned on to receive the second excess current X2 (3 A), the second excess current X2 (3 A) flows through the third current path path3. And if the need of the third Irc3 is 1 A, the switch3 is turned on to receive the third excess current X3 (2 A), and the excess current X3 (2 A) flows through the fourth current path path4.

Therefore, when the current Isrc provided by the current source 110 is greater than the powers needed for lighting the LEDs LED1~LEDN, the LED control circuit 100 of the present invention does not require a regulator circuit to regulate the current Isrc. Instead, the present invention controls the currents Isrc1~IsrcN flowing through the LEDs LED1~LEDN to be under the target values by shunting the excess current to another current path. Furthermore, each LED monitor m1~mN is not limited to an amplifier. Instead, each LED monitor m1~mN can be a comparator circuit composed by a plurality of amplifiers.

Besides, similar to FIG. 5, each LED monitor m1~mN of the second circuit structure of an LED control circuit of the present invention can be composed by a plurality of amplifiers such as an OTA amplifier and an OP amplifier. In each LED monitor m1~mN, an output terminal of the OTA amplifier is connected to a positive input terminal of the OP amplifier and an output terminal of the OP amplifier is further connected to the third terminal of one of the switches.

Moreover, each switch switch1~switchN is not limited to a transistor only. Instead, in other embodiments, each switch switch1~switchN can be a switch circuit. Similar to FIG. 6(A), each switch switch1~switchN of a second circuit structure of an LED control circuit of the present invention can be a switch circuit composed by a magnetic component such as an inductor and a transformer, or a resistor, a capacitor, a transistor, a diode. Each switch switch1~switchN can also be a switch circuit composed by the said components. When the switches switch1~switchN are composed by the said components, the regulation method should be PWM. Each switch circuit further includes a transistor where the gate terminal of the transistor can be the third terminal T3 of each switch switch1 switchN connected to the output terminal Tout of each respective LED monitors m1~mN.

Thus, the skilled person in the art can change the structure of the LED control circuit 100 of the present invention according to the use of different current sources 110. The skilled person in the art can also change the components of the LED control circuit 100 of the present invention according to different circuit designs. For example, the LED monitors m1~mN can be changed to PWM according to FIG. 5 or the switches switch1~switchN can be changed according to FIG. 6(A). It should be noted; however, that the currents Isrc1~IsrcN flowing through the LEDs LED1~LEDN must be meet the target values to reduce the possibility of the LEDs LED1~LEDN from being damaged by the excess currents flowing through the LEDs LED1~LEDN.

Hence, the present invention provides a LED control circuit, wherein when a current flowing through the LED is greater than that needed by the LED, other current paths can be turned on and parts of the current can flow to the new current paths. This prevents the LED from being damaged by the excess current flowing through the LED.

Although the present invention has been explained in relation to its preferred embodiments, it is to be understood that many other possible modifications and variations can be made without departing from the spirit and scope of the invention as hereinafter claimed.

What is claimed is:
1. An LED control circuit, comprising:
a current source including a positive terminal and a negative terminal for providing a source current;
first to (N+1)-th current paths connected with each other in parallel, where N is a positive integer greater than one;
first to N-th LEDs disposed on the first to N-th current paths, respectively each LED including a cathode and an anode terminal connected to the positive terminal of the current source;
first to N-th LED monitors, each LED monitor including an input terminal an output terminal, wherein each input terminal of the first to N-th LED monitors correspondingly connected to the first to the N-th current paths to receive first to N-th currents;
wherein, when the first LED monitor detects a first current meets a first target value, when the source current provided by the current source is greater than first target value, a first excess current is generated, and a second current flows through the second current path,
wherein, when the N-th LED monitor detects a N-th current meets a N-th target value, when a (N−1)-th excess current divided from a (N−1)-th current is greater than the N-th target value, a N-th excess current is generated, and a (N+1)-th current flows through the (N+1)-th current path.
2. The LED control circuit of claim 1, wherein the input terminal of each LED monitor includes a positive input terminal and a negative input terminal, each positive input terminal of the first to N-th LED monitors is correspond- ingly connected to the first to N-th current paths, and the negative input terminals of the first to N-th LED monitors receive the first to N-th target values, respectively.

3. The LED control circuit of claim 1, further comprising first to N-th switches disposed on the second to (N+1)-th current paths, respectively, each switch including a first terminal and a second terminal, wherein the first terminals of the first to (N−1)-th switches are connected to the cathodes of the second to N-th LEDs via the second to N-th current paths, the first terminal of the N-th switch is connected to the positive terminal of the current source via the (N+1)-th current path, respectively.

4. The LED control circuit of claim 2, wherein each switch includes a third terminal, and the third terminals of the first to N-th switches are connected to the output terminals of the first to N-th LED monitors, respectively.

5. The LED control circuit of claim 2, wherein, when the (N+1)-th current flows through the (N+1)-th current path for conducting the N-th excess current, and the currents satisfy the following equations:

$$Isrc = Isrc1 + X1;$$

$$X1 = Isrc2 + X2;$$

$$X2 = Isrc3 + X3;$$

$$XN = Isrc(N+1);$$

wherein Isrc1 is the first current being equal to the first target value, Isrc is the source current, Isrc(N) is the N-th current being equal to the N-th target value, Isrc(N+1) is the (N+1)-th current, XN is the N-th excess current.

6. The LED control circuit of claim 2, wherein each switch includes a transistor.

7. The LED control circuit of claim 2, wherein each LED monitor includes a first amplifier having the positive input terminal and the negative input terminal.

* * * * *